United States Patent Office 3,055,793
Patented Sept. 25, 1962

3,055,793
PROCESS FOR THE MANUFACTURE OF CELLULOSE PULP AND A RECOVERY PROCESS FOR COOKING CHEMICALS COMBINED THEREWITH
Sven Axel Rydholm, Saffle, Sweden, assignor to Billeruds Aktiebolag, Saffle, Sweden
No Drawing. Filed July 6, 1959, Ser. No. 824,916
8 Claims. (Cl. 162—38)

The present invention relates to a method for producing cellulose pulp, for instance paper-making and derivative pulp, while recovering the cooking chemicals.

The following is a flow diagram illustrating the order of steps in the process of the present invention.

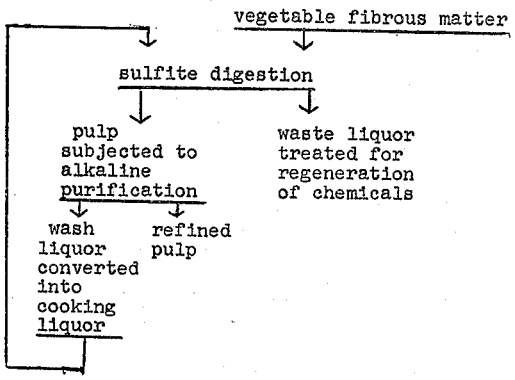

In producing sulphite pulp an alkali or alkaline earth metal hydroxide or carbonate is usually required for the preparation of the cooking liquor, for forming of metal bisulphite. This alkali has for long been called the "base" of the cooking liquor. Calcium base is still the most common one, the cooking liquor being prepared from limestone. However, certain technical advantages are attained by using so called soluble bases, of which sodium base is of special interest. For sodium base digestions the cooking liquor is usually prepared from sodium carbonate or sodium bicarbonate, but sodium hydroxide may also be contemplated. In producing certain types of pulp, such as derivative pulps and special paper-making pulps, an alkaline treatment of the sulphite pulp at elevated temperature is necessary, the alpha-cellulose content of the finished pulp being used as a criterion of quality. This hot alkaline treatment is usually performed in the bleachery and is then called hot caustic treatment or hot purification, but in recent years processes have also been advanced in which the hot alkaline treatment is performed in the digester after the sulphite cook by introducing a concentrated sodium carbonate solution directly to the hot digester content, possibly after relieving gas from the sulphite cook and withdrawal of waste liquor. In doing so, however, certain difficulties of a technical nature will arise, including a considerable soda consumption, as large quantities of remaining acid waste liquor must first be neutralized before the batch attains sufficient alkalinity. This considerably encumbers the regenerating process and may limit the practically attainable purification effect.

In hot purification in the bleachery sodium hydroxide is usually used, often in comparatively large amounts and without regeneration. This economically unsatisfactory state of things depends on the fact that the waste liquor from this alkaline treatment is comparatively poor in organic matter so that an evaporation and combustion for regeneration is not profitable. On the other hand, in the above mentioned two-step cooking process with an alkaline digestion after the sulphite digestion the advantage is gained that the alkaline metal forms part of the common waste liquor and may thus be regenerated and, in addition, the organic substance dissolved in alkaline treatment will benefit the combustion.

The present invention now has for its object to combine the advantages of using a regeneratable alkali with the advantages residing in the hot alkaline treatment being performed on a sulphite pulp which has been freed from all acid waste liquor by washing. The invention aims at preparing the cooking liquor from the purification waste liquor. The reason why this possibility has not been observed previously would seem to be the fact that the main portion of the alkali is considered to be consumed during the hot purification. A more intimate knowledge of the acidity conditions in the hot purification and the sulphite cooking will show, however, that an alkaline base which may be considered as being consumed for the purification reaction is still to be considered as active in a sulphite cooking process. The fact is that in the hot purification the alkali is consumed substantially by the saccharic acids formed by the carbohydrates at their dissolving. The half-neutralization point of these acids lies substantially at pH 3.7. They are thus substantially undissociated during the sulphite cooking, which takes place in the pH-range 2–3, thus leaving the alkaline base free for the formation of bisulphite ions. The circumstances are illustrated by the following reaction formulae.

Hot purification:

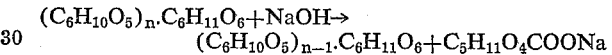

Preparation of cooking liquor:

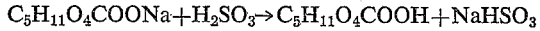

In principle the process is carried out in the following way. The pulp obtained from the sulphite digestion is washed as usual for recovering waste liquor for regeneration of chemicals. The waste liquor may then first be subjected to fermentation for producing alcohol, which is not possible in processes with an alkaline final cooking stage. The washed pulp passes on to the bleachery for hot purification, possibly after an initial chlorination step. The refining waste liquor is used principally for the preparation of cooking liquor but may possibly be used, in a more or less strengthened state, for an initial neutral or weakly acid or even weakly alkaline cooking stage, which as a rule, however, is suitably half-acid. This stage may be employed in certain connections, for instance in pine cooking. Whether it is used in such a way or not it is strengthened to acid cooking liquor with an excess of sulphur dioxide and is used in the acid digesting step. After the sulphite digestion the waste liquor will thereby include, disregarding the washing losses, all organic substances which are dissolved out during both sulphite digestion and hot purification, together with all chemicals used in said two processes, which is a great advantage. By the pulp being washed before the purification the quantities of purification alkali may be limited to such an extent that they occur in an amount just enough for the sulphite digestion. Only when a very high alpha-content is desired in the finished pulp, so much alkaline compounds may be needed for the alkaline treatment that a part of the waste liquor therefrom must be directly combined with the sulphite waste liquor, which is no disadvantage. The alkaline compound for the purification may be sodium hydroxide, but as it is regenerated in the form of sodium carbonate it seems fairly obvious to use it directly in this form, possibly mixed with sodium sulphite, which is already known per se. The regeneration of the sulphur dioxide for the sulphite digestion from the sulphite waste liquor takes place in a manner known per se.

The following examples of carrying the invention into practice are given only in order to explain more fully the effects that may be attained, but they are not intended to confine the invention to the conditions stated. For instance, the process is useful for coniferous woods as well as for leaf woods.

*Example 1*

Spruce sulphite pulp with a cooking yield of 54%, chlorine number 5.5 and an alpha-cellulose content (analyzed on chlorite delignified samples) of 85%, was purified without prior chlorination with 250 kgs. $Na_2CO_3$ per metric ton of pulp at 160° C. for 2 hours. A pulp having a chlorine number of 1.7 and an alpha-cellulose content of 95% was then obtained with a yield of 75%. The purification waste liquor (pH 9.6), extracted to 95% by displacement, was strengthened with $SO_2$ to a total $SO_2$-content of 6%, after which digestion was performed with spruce chips to a cooking yield of 55%, a chlorine number of 6 and an alpha-cellulose content of 85%. The pulp thus obtained was then purified with 250 kgs. $Na_2SO_3$ per ton of pulp at 160° for 2 h. A pulp was obtained with a yield of 75%, a chlorine number of 1.6 and an alpha-cellulose content of 95%. In this way the process may be repeated any number of times wth the same fine result, that is, always with pulp yields of 40–42% calculated on the wood, chlorine numbers between 1.5 and 2, and an alpha-cellulose content of about 95%. The presence of sulphite at the alkaline treatment causes a somewhat higher alpha-content and a more light-coloured pulp without involving any inconvenience at the sulphite digestion.

*Example 2*

Another portion of the spruce sulphite pulp described in the opening section of Example 1 was chlorinated with 60 kgs. of chlorine per metric ton of pulp, and after thorough washing, it was then purified as in Example 1. The pulp obtained had an alpha-cellulose content of 95.5% and the yield was 73%. The purification waste liquor extracted by displacement could be used for sulphite digestion after strengthening according to the same principles as in Example 1 and with the same result. A light alkaline treatment of the chlorinated pulp during or after the washing does not change the result of the subsequent alkaline purification or of the sulphite digestion performed with the waste liquor therefrom but causes an advantageous reduction of the chloride content of the waste liquor from the purification step for the preparation of cooking liquor, which saves the apparatus assembly from chloride corrosion.

*Example 3*

Spruce sulphite pulp with a cooking yield of 48%, chlorine number 2.5 and an alpha-cellulose content (analyzed on chlorite delignified samples) of 87% was purified without prior chlorination with 200 kgs. $Na_2CO_3$ and 50 kgs. $Na_2SO_3$ per metric ton of pulp at 170° C. for 1 h. A pulp having a chlorine number of 1.0 and an alpha-cellulose content of 96.5% was obtained with a yield of 80%. The purification waste liquor, extracted to 95% by displacement, was strengthened with $SO_2$ to a total $SO_2$-content of 1.3% and pH 5, after which digestion was performed with spruce chips in two steps, first at 110° C. for 2 h. and, after strengthening to a total $SO_2$-content of 5%, for 2 h. at 135° C. to a pulp with a yield of 48%, chlorine number 2.8 and an alpha-content of 86.5%. This could be purified once more with sodium carbonate and sulphite under the same conditions as the original pulp and with a similar result.

What is claimed is:

1. A method in the manufacture of cellulose pulp from vegetable fibrous matter by digestion with a cooking liquor consisting of an acid alkaline metal sulfite solution and purification of the pulp with an alkaline purification liquor, characterized in that the waste liquor from the purification is converted to a cooking liquor for the digestion of a new batch of vegetable matter, and the waste liquor from the digestion is subjected to recovery of alkaline metal compounds.

2. A method according to claim 1, in which said cooking liquor consists of an acid sodium sulphite solution, and said purification liquor is a solution of at least one of the hydroxide and the carbonate of sodium.

3. A method according to claim 2, in which the waste liquor from the acid digestion step is subjected to treatment for the recovery of sulphur dioxide and sodium carbonate, said carbonate being used for the preparation of the purification liquor.

4. A method according to claim 2, in which the purification liquor contains at least one of the compounds sodium carbonate and sodium hydroxide and has an admixture of some sulphur dioxide.

5. A method according to claim 2, in which, after separation of the pulp, the waste liquor from the purification step is strengthened with sulphur dioxide to form acid sulphite cooking liquor of normal composition for digestion of fresh quantities of vegetable matter.

6. A method according to claim 1 in which the purification is performed directly on the washed unbleached pulp, which is then delignified and finally bleached in conventional way.

7. A method according to claim 1 in which the pulp from the digesting step is chlorinated, then alkaline treated for removing chlorine compounds, then subjected to said alkaline purification, and finally bleached in conventional manner.

8. A method according to claim 1, comprising separating the waste liquor from the pulp after said purification, adding sulphur dioxide in an amount from nil up to an amount rendering the liquor weakly acid so as to form a pre-cooking liquor, cooking a quantity of said vegetable fibrous matter with said pre-cooking liquor in a pre-cooking step, then adding sulphur dioxide to the pre-cooking liquor in an amount sufficient for converting the liquor to a digesting cooking liquor of normal composition, and using the liquor thus strengthened in the digestion step.

References Cited in the file of this patent

UNITED STATES PATENTS

| | | |
|---|---|---|
| 1,896,038 | Bradley | Jan. 31, 1933 |
| 2,032,437 | Richter | Mar. 3, 1936 |
| 2,639,986 | Kyrklund | May 26, 1953 |
| 2,747,995 | Hooper | May 29, 1956 |